Sept. 14, 1965    C. E. SODERBERG    3,205,673
AUGER TYPE ICE FLAKE MACHINE AND METHOD
Filed Sept. 24, 1962    2 Sheets-Sheet 1

INVENTOR.
CARL E. SODERBERG
BY
John H. Widdowson
ATTORNEY

Sept. 14, 1965 C. E. SODERBERG 3,205,673
AUGER TYPE ICE FLAKE MACHINE AND METHOD
Filed Sept. 24, 1962 2 Sheets-Sheet 2

INVENTOR.
CARL E. SODERBERG
BY
John H. Widdowson
ATTORNEY

United States Patent Office 3,205,673
Patented Sept. 14, 1965

3,205,673
AUGER TYPE ICE FLAKE MACHINE
AND METHOD
Carl E. Soderberg, 707 N. Main, Wichita, Kans.
Filed Sept. 24, 1962, Ser. No. 225,622
9 Claims. (Cl. 62—71)

This invention relates to freezing liquids. In a more specific aspect, this invention relates to apparatus and methods for freezing liquids. Still more specifically, this invention relates to apparatus and methods for producing relatively small ice crystals or chips from water. Still more specifically, this invention relates to improvements in freezing apparatus which enable the apparatus to efficiently and dependably produce small ice crystals or chips continuously or intermittently. In a still more specific aspect, the invention relates to improvements in apparatus for continuously or intermittently producing small ice particles having a freezing chamber and an auger means in the chamber to remove the ice particles.

Freezing apparatus for producing frozen liquid or ice particles having a freezing chamber and an auger disposed therein are known in the art. However, the freezing apparatus known to the prior art has been unsatisfactory. The apparatus is in general undependable in operation. In operation material or water to be frozen, as the case may be, is frozen in a freezer chamber and is subsequently moved out of the chamber with an auger means. The ice in the form of particles often cakes up between the auger and the freezer chamber surface especially near the outlet freezing into a solid mass. This effectively locks the auger relative to the chamber. When this happens, a number of serious consequences may develop. The motor turning the auger may burn out, the shaft or the driving mechanism of the auger may break, or if the freezer is correlated with the operations of associated apparatus, there is a complete disruption of operation. At the very least, even if there is no mechanical breakage, there is a disruption of service which in many instances is very objectionable and can result in loss of profit, etc. Further the freeze-up necessitates a time consuming and costly service operation to thaw out the freezer apparatus.

A further shortcoming of the freezer apparatus of the prior art concerns the type of product produced. The frozen product or ice chips, as the case may be, is invariably wet consisting of a mixture of frozen particles and fluid or water. This wet frozen product or ice has a poor and objectionable appearance which has a direct effect on its saleability and utility. Further, if this wet product is stored in a chamber at a temperature below freezing, the entire mass of frozen product may solidify into a single unitary mass which is difficult if not impossible to handle. If the freezer apparatus known to the prior art is used in connection with a beverage dispensing apparatus, the wet ice causes an objectionable dilution of the dispensed beverage resulting in a non-uniform quality beverage product. While ice can be frozen and chipped or produced in a clear crystalline form, the flake or crushed ice making machines of the prior art will not do so because they have to make a very soft and wet ice in order to operate at all.

The known methods of producing frozen crystal particles of fluid or water have much the same shortcomings as the prior art freezing apparatus. The ice produced by the known method is wet and damp. The known methods are also undependable and inefficient and subject the apparatus used to carry out the methods to breakage hazards.

I have with the new freezer apparatus and method of freezing of my invention overcome the great aforementioned disadvantages of the freezing apparatus and methods of the prior art. The new freezer apparatus structure of my invention has proven completely free of these problems in operation. My new freezer apparatus is adapted to either continuously or intermittently manufacture a relatively dry frozen product in an efficient dependable and trouble-free mode of operation. The ice produced by the new apparatus of my invention is crystal clear and in the nature of chipped ice from a block, and as clear as cube ice from cube making machines. My new method of freezing liquids overcomes all the aforementioned problems of the prior art. My new method produces relatively dry frozen products. It also eliminates the danger of breakage of the equipment used to carry out the method.

The new freezer apparatus of my invention has a freezing chamber with means mounted therein to remove material frozen therein and deliver same to an outlet therefor. Means are provided therewith for applying pressure to the frozen material prior to discharge through the outlet, preferably by means constricting the outlet for material frozen from the chamber. A means is also provided to remove heat from the freezing chamber. Preferably, a means to heat the area of the chamber near the outlet is provided.

The new method of producing frozen crystal particles of my invention comprises first freezing a fluid. Pressure is then applied to the frozen fluid while continuing to extract heat. Subsequently, the applied pressure is removed. Preferably the pressure is applied in an environment that is heated to a slightly higher temperature than the environment in which the fluid is frozen.

The new freezing apparatus of my invention overcomes all of the aforementioned problems relating to freezing apparatus of the prior art. In order to overcome the problems associated with freezing of the frozen ice particles into a solid mass in the chamber, I have provided a means to apply a limited amount of heat to the freezing chamber area in the vicinity of the outlet of the chamber. The heat applied raises the temperature of the wall of the freezing chamber to slightly above the critical temperature below which the particles of ice or fluid will agglomerate and freeze. This heating is accomplished by utilizing the sensible heat remaining in the condensed fluid of the refrigeration system prior to this introduction into the expansion or cooling coils. I have found that this amount of heat is very near the correct amount necessary to maintain the temperature of the outlet surface near the desired point. By utilizing this type of arrangement I have achieved a more efficient trouble-free system insofar as the refrigeration and heating means is concerned, since the amount of heat remaining in the aforementioned fluid is the proper amount. No control means is necessary to regulate the amount of heat applied as would be the case if an auxiliary source of heat were utilized. Further, the cooling of the refrigerant prior to its introduction into the expansion or cooling coils results in a greater efficiency in the refrigeration cycle.

In order to enable the freezer apparatus structure of my invention to produce a relatively dry and clear crystalline frozen product, I have provided it with a constriction means near the product outlet of the freezing chamber. As my special auger rotates, it first scrapes the layer of ice off the lower and intermediate portions of the freezing chamber and moves it upwardly into a zone of increasing volume and toward the constricted opening. Since the opening is constricted the ice particles accumulate and a pressure is built up, compacting the ice and squeezing the excess water therefrom.

Also, it is theorized that the effect of this increased pressure resulting from the combination of the constricted opening and the continued rotation of the auger results in a lowering of the melting point of ice under pressure. When the melting point is lowered the ice under pressure starts to melt in order to again achieve an equilibrium state, however, as the ice melts it absorbs heat from the surrounding environment, extracting some heat from the ice particles and some heat from the freezer wall. This lowers the temperature of the ice to a temperature which is below the normal melting point it would have under normal atmospheric pressure. Consequently when the ice leaves the constricted opening and the pressure is removed it emerges as a frozen solid cooled below its freezing point. In so doing, the ice having been cooled below the freezing (or melting) point, it freezes the film of water or liquid on its surface, thus producing the relatively dry film free and clear ice. It has been found that the heating coils of the freezing chamber serve a vital function of adding heat to replace the heat absorbed by the aforementioned melting. Without this addition there is a likelihood that the ice will freeze up around the auger and chamber outlet.

The method of my invention utilizes the same principle set forth above to produce a relatively dry ice. My novel method embodies the step of constricting the outlet of the freezer chamber thus applying a pressure to the ice after it has been frozen and prior to its expulsion from the chamber. Another aspect of the method of my invention is the application of heat to a portion of a freezing chamber containing the ice under pressure. This application of heat prevents the freezing solid of the particles and its associated problems. Also, it has been found important to provide the ice accumulation zone of increasing volume to receive and compact the ice past the walls of the freezing chamber to place same under pressure and remove excess water therefrom.

It is an object of this invention to provide new freezing apparatus.

It is another object of this invention to provide new methods of freezing fluids.

It is still another object of this invention to provide a freezing apparatus having a means to apply a pressure to the frozen material while disposed in the freezing chamber of the apparatus.

Yet another object of this invention is to provide a freezing apparatus having a means to prevent the freezing and locking of the auger in the freezing chamber of the apparatus.

Still another object of this invention is to provide a freezing apparatus for continuously or intermittently freezing ice or the like having a constriction means in the vicinity of the outlet and a heating means for heating a portion of the chamber near said outlet.

Yet another object of this invention is to provide a method of producing frozen crystal particles that are dry and of clear crystals.

Still another object of this invention is to provide a method of freezing water into crystal particles or chips wherein the chips are subjected to a pressure above atmospheric.

Yet another object of this invention is to provide a method wherein heat is added to ice or the like during the freezing cycle but prior to its being expelled from the freezing chamber.

Other objects of the new freezing apparatus and method of my invention will become apparent to those skilled in the art upon reading the disclosure.

Drawings accompany and are a part of this disclosure. These depict preferred specific embodiments of the new freezing apparatus structure of my invention and it will be understood that such drawings are not to unduly limit the scope of my invention.

Figure 1:
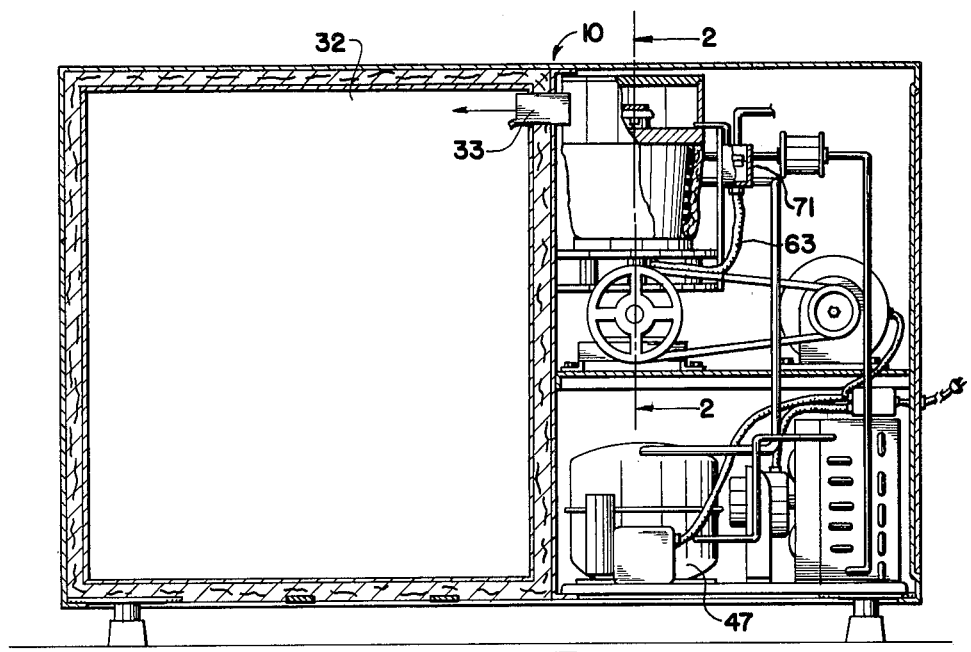
FIG. 1 is a front elevational view of the freezer apparatus and storage means combination of my invention.

The following is a discussion and description of the new ice making machine structure of my invention, made with reference to the drawings wherein the same reference numerals are used to indicate the same or similar parts and/or structure. The discussion and description is of preferred specific embodiments of the new ice making machine of my invention, and it is to be understood that such is not to unduly limit the scope of my invention.

Figures 2, 3, 4:
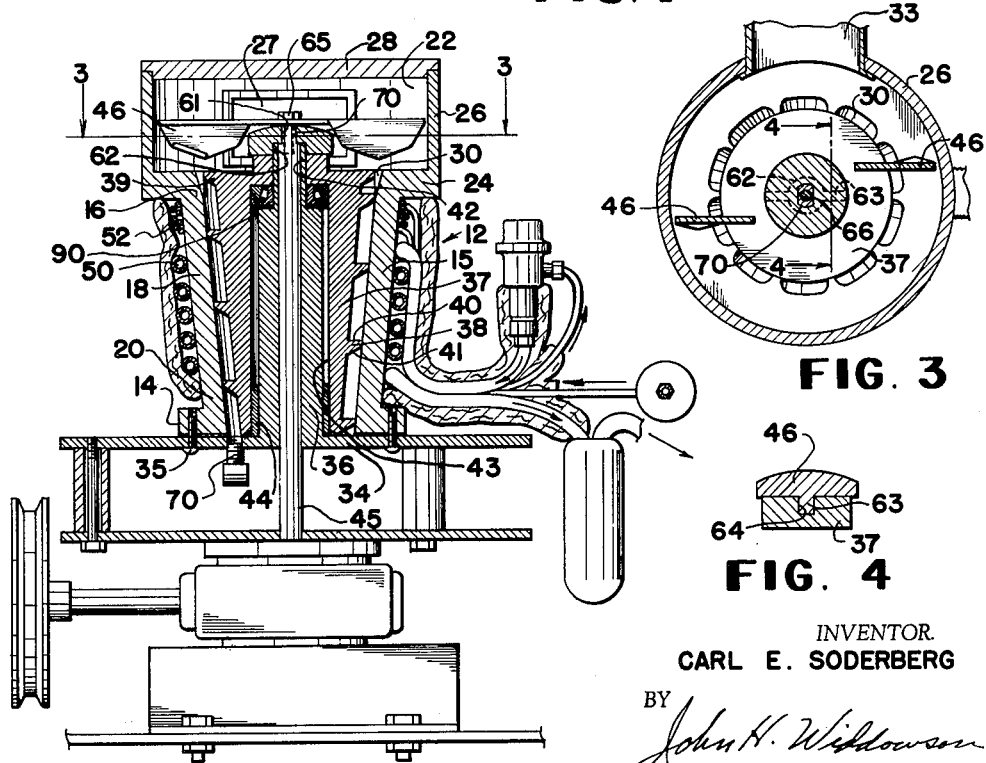
FIG. 2 is a side elevational view partially in cross section of the freezing apparatus of my invention taken on line 2—2 of FIG. 1.
FIG. 3 is a plan view partly in cross section taken on line 3—3 of FIG. 2.
FIG. 4 is a cross sectional view taken on line 4—4 of FIG. 3 showing the locking ararngement between the shaft and harvest means.

Referring now to the drawings, FIGS. 1–7, and FIGS. 1 and 2 in particular, the ice making machine apparatus combination 10 is a preferred specific embodiment of the structure of my invention. My ice making machine has a unitary upright vessel 12 having a flange base portion 14. The vessel 12 has a downwardly tapered frusto-conical freezing chamber 15 having upper, intermediate and lower portions 16, 18 and 20, respectively. The wall of the freezing chamber 15 is of constant thickness and is smooth and tapered outside and inside. An enlarged accumulation chamber is constructed and adapted to receive ice particles or the like from the freezing chamber. The accumulation chamber consists of a flat radially extending bottom portion 24 integrally joined to the upper portion 16 of the tapered freezing chamber, and an upright cylindrical portion 26 integrally joined to the radially extending bottom portion 24. An opening 27 is disposed in the cylindrical portion 22 of the accumulation chamber. A top cover 28 is provided for the accumulation chamber. Along the top inside edge of the tapered freezing chamber, there are spaced upwardly flared serrations 30 that open upwardly from the freezing chamber into the accumulation chamber. Adjacent to the freezing apparatus is provided an insulated storage chamber 32 with a chute means 33 joining the rectangular opening 27 to an opening in the insulated storage chamber. This arrangement allows ice frozen in the freezing chamber to be moved into the accumulation chamber and from there into the storage chamber 32. Referring now to FIG. 2, a support 34 is shown for the freezing vessel. Bolt means 35 secure support 34 to the freezing vessel 12. This freezer support serves as a bottom for the freezing vessel and is provided with an integrally formed upwardly extending cylindrical shaft housing 36 that is positioned concentrically of the tapered chamber. The frusto-conical auger means 37 having upper and lower portions is positioned in the tapered freezing chamber forming an annulus with the inside wall of same of upwardly increasing cross section, thus providing an upwardly increasing space in terms of volume to receive ice frozen in the machine on the inside walls of chamber 15 and scraped therefrom by the flight 38 of auger 37. The shape of the annulus is quite important. The auger moves or pushes ice particles or the like from the lower portions of the freezing chamber upwardly. Since the mean diameter of the chamber increases as the distance from the bottom of the chamber increases, the chamber is effective to break up frozen particles. Further, as the water freezes and changes to ice its volume also increases. The chamber annulus is therefore adapted to accommodate this change in volume, permitting a dryer and harder ice to be produced in chamber 15, and resulting in greater production of ice. The tapered complementary shapes of the auger means 37 and chamber 15 are also important because this tapered configuration makes possible a simple, easy, but accurate adjustment for providing the proper clearance between the auger means and chamber. Frequently, parts or elements that fit perfectly at one temperature do not fit properly at other temperatures due to thermal expansion. This problem is particularly troublesome when the elements or parts are made of dissimilar materials and subjected to great temperature changes as in freezer apparatus. In order to adjust the clearance between the frusto-conical auger means 37 and frusto-conical chamber 15 of my invention to compensate for thermal expansion and the like, washer 90 is replaced with another washer or suitable shim means of a different proper thickness. This shifts the auger and chamber longitudinally of each other and varies the clearance therebetween. The auger means 37 has a helical flight 38 adapted in its edge portion to slideably engage the inside wall of the tapered chamber. The auger is also provided with a top blade flange 39 that extends completely around the top of the auger. This top blade flange 39 in combination with serrations 30 form a plurality of upwardly facing openings or constrictions that restrict the annulus between the auger and the inside wall of the freezing chamber. The flight 38 has a top surface 40 generated by rotating and simultaneously advancing a perpendicular vector radius about the axis of the auger, and a lower surface 41 generated by rotating and advancing the upwardly inclined vector radius about the same axis. The auger means 37 is provided with a relatively small concentric bore 42 in the upper portion thereof and the larger bore 43 in the opposite and lower end portion. The large bore is adapted to receive the shaft housing 36. A pilot bearing 44 is positioned at the lower end portion of the auger and engages the large bore previously mentioned, and the shaft housing. On the top of the shaft housing 36 is provided a tapered roller bearing that supports the auger relative to the shaft housing and the freezing chamber. An upright shaft 45 extends through the shaft housing 36 and is secured in rigid relationship to said auger means. A harvest means 46 is rigidly secured to shaft 45 and is positioned in the accumulation chamber 22. The rigid connection means between the shaft 45, auger 37 and harvest means 46 is clearly illustrated in FIGS. 2, 3 and 4 of the drawings. The top end of shaft 45 is provided with a non-circular longitudinally extending portion 70. The harvest means 46 is provided with a central opening 61 that is complementary in shape to the extending portion 70 and also receives a portion of the shaft 45 in a concentrically positioned boss 62. The harvest means is provided with a radially extending key portion 63 that fits into a keyway 64 disposed on the top of auger 37. A stud bolt means 65 threadedly engaged in a threaded hole 66 secures the above-mentioned assembly of shaft, harvest means and auger in positively secured relationship. The harvest means conveys the frozen material or ice chips that have been removed from the freezing chamber and forced into the accumulation chamber into a storage chamber 32. A power means is connected to the shaft 45 to rotate same. Any suitable power means can be provided for this purpose, preferably an electric motor as shown. Any suitable gearing means connecting the motor to the shaft can be used.

Figure 7:
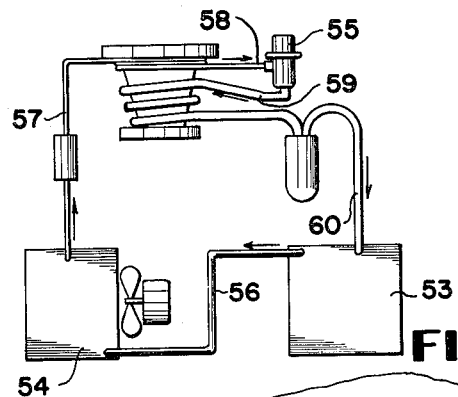
FIG. 7 is a diagrammatic view of a preferred refrigeration system and its arrangement relative to my freezer apparatus.

My freezing apparatus is provided with a very advantageous arrangement of the refrigeration means. This refrigeration means arrangement consists of cooling coils 50 disposed about and operatively engaging the outside wall of the lower 20 and intermediate 18 portions of the freezing chamber. Heat exchange coils 52 are disposed about and operatively engage the outside wall of the upper portion 16 of the frezing chamber. The refrigeration means also includes a compressor means 53, heat exchange means 54, and an expansion valve means 55, as illustrated in FIG. 7. Conduit means 56 connecting the compressor means to the heat exchanger means, conduit means 57 connecting the heat exchanger means to the heat exchanger coil, conduit means 58 connecting the heat exchanger coil and the expansion valve means, conduit means 59 connecting the expansion valve means to the cooling coils, and conduit means 60 connecting the cooling coils to the compressor means, are provided to operatively connect the various components of the refrigeration means into the operative system.

It is to be understood that other suitable means for metering the refrigerant to the cooling coils can be substituted for the above-mentioned expansion valve 55. Such means includes orifaces, constriction means, capillary tubes and the like.

My provision of a set of heating coils to heat the top portion of the freezing chamber has been found to be very beneficial. I have found that the amount of available heat remaining in the refrigerant after it has been passed through the condenser means is about the proper amount to prevent freezing up of the auger in the chamber. In my arrangement there is no necessity for a separate control to control the amount of heat added as would be the case if an auxiliary heating system were provided. The amount of heat added is necessarily quite small since a large amount, if added, would disrupt the function of the freezing chamber. The most desirable temperature of the top portion of the freezing chamber is in the vicinity of the freezing point of the water or fluid being frozen. It may be slightly below the freezing temperature since the melting point of the fluid or water is depressed if a pressure is applied to the frozen material or water as was previously explained. The heating coil arrangement has utility in freezing apparatus not provided with a constriction means to prevent freeze-up, and in apparatus not utilizing the new special auger and freezing means of my invention.

In order to introduce fluid or water into the freezing chamber I have provided a passage means 70 disposed in support 34 to communicate with the interior of the freezing chamber. As illustrated in FIG. 1 there is a float valve 71 connected to a source of water and a conduit means connecting the float valve and the passage means. The float valve, passage means, and conduit means cooperate in operation to introduce and maintain fluid or water at a constant level in the freezing chamber.

In operation water is introduced into the freezing chamber 15 where it freezes on the lower and intermediate inside wall portions of the chamber, due to the heat removing action of the cooling coils. The auger 37 is rotated to scrape the layer of ice or the like material from the side of the freezing chamber. The ice is then forced upwardly into the accumulation chamber 22. The shape of the annulus between the auger and the freezing chamber is effective to accommodate the expansion of the water or the like as it freezes and also break up the larger particles into smaller particles and to accommodate all the ice frozen and removed from the walls of chamber 15. The movement of the ice upwardly in the freezing chamber is impeded by the constriction formed by the serrations and the top blade flange of the auger. Consequently, a pressure is applied to the ice in the top portion of the chamber which is effective to depress the freezing or melting point of the water or frozen material. The heating coils disposed about the top of the freezing chamber prevent the material from freezing into a solid mass to lock the auger relative to the freezing chamber. While the ice is under pressure in the top portion of the freezing chamber, its temperature is lowered below its normal freezing temperature at atmospheric pressure. Upon emerging from the constricted opening the pressure is released and the melting point reverts back to normal. Since the ice or frozen material has been cooled below the freezing temperature any film of water or fluid on the ice particles is immediately frozen. This results in a dry and clear product. The main harvest means conveys the frozen material from the accumulation chamber 22 into the storage chamber 32 through chute 33.

Figure 5:
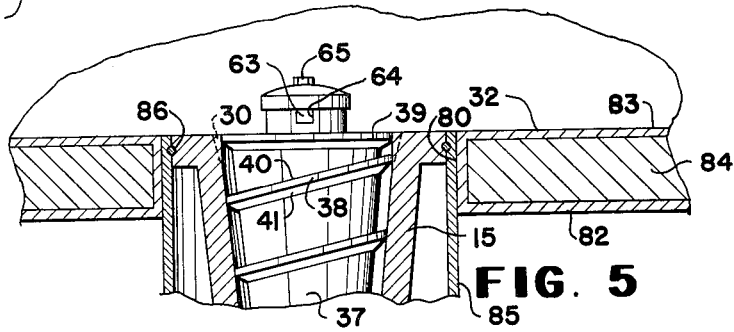
FIG. 5 is a cross sectional view partly in cross section showing the freezer apparatus mounted in the bottom of a storage bin or means and also illustrating the specific details of the auger means.

FIG. 5 shows a modified and preferred embodiment of my invention. The freezer apparatus is shown mounted in the bottom of an ice storage means 32. The freezer apparatus so mounted is adapted to manufacture and force the ice particles upwardly from the bottom of the ice storage means 32 to fill and/or maintain the necessary supply of ice. The freezer apparatus, including freezing chamber and auger 37 are mounted as a unit in an opening 80 in a chamber storage means 32. Preferably the chamber has spaced walls 82 and 83 having insulation 84 disposed therebetween. The freezer apparatus can be surrounded by a cylindrical sheet-like jacket 85. The freezer chamber is secured to the jacket 85 with a locking ring 86. Any other suitable securing means may be utilized.

Figure 6:
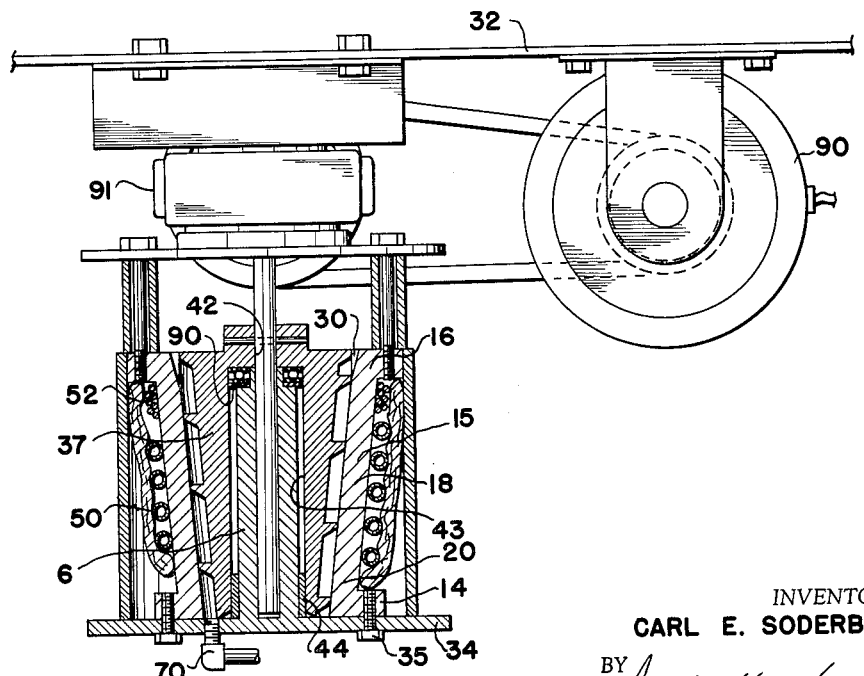
FIG. 6 is a longitudinal view partly in cross section of a modified embodiment of my freezer apparatus structure suspended in a storage bin or means.

FIG. 6 shows another modified embodiment of my invention. The apparatus depicted is used in combination with a storage means, which combination has utility in beverage dispensing machines, ice dispensing machines and the like as well as numerous other applications. The freezer apparatus including freezer chamber 15, auger 37, drive means 90, and transmission means 91 is shown suspended from the top or other support of a storage chamber means 32. The freezer apparatus so mounted is adapted to manufacture ice and force it upwardly out of the freezer chamber 37. The ice particles upon emerging overflow and fall downwardly to fill and/or maintain a supply of ice particles in the storage chamber 32. This structural arrangement has proved beneficial in beverage and ice dispensing machines as well as other applications in both home and industry.

The new method of my invention of continuously producing dry crystal ice or frozen material in my preferred specific embodiment comprises the steps of introducing water or fluid into a freezing chamber. The freezing chamber is preferably tapered and of a frusto-conical shape. Heat is removed from a portion of the freezing chamber. Preferably the heat is removed from the lower and intermediate portions of this chamber. As the heat is removed, a layer of ice or the like is formed on the walls of the freezing chamber. This layer of ice is then removed from the freezing chamber wall. The removal of this layer is preferably accomplished with a frusto-conical auger means concentrically disposed in the freezing chamber. The frozen ice or material is then transferred to another portion of the chamber. Preferably, but not necessarily, the shape of the chamber is such that the cross sectional area of the chamber is greater as the distance from the bottom increases. Upon arriving at the aforementioned portion of the chamber, pressure is applied to the ice or frozen material previously formed. This pressure can be applied to the ice or frozen material by any convenient means, but I have found the preferable method to be forcing it through a constricted opening with an auger. A small quantity of heat is preferably added to the area in the vicinity of the opening for preventing freezing up of the auger and the chamber.

As will be obvious to those skilled in the art, various changes and modifications of the preferred ice making apparatus structure and the preferred method of freezing water or frozen material disclosed herein can be made or followed without departing from the spirit of the disclosure or the scope of the claims.

I claim:

1. An apparatus to manufacture and store relatively small crystal ice particles comprising, a unitary upright vessel, said vessel having a flanged base portion, a downwardly tapered frusto-conical freezing chamber having upper, intermediate and lower portions and a wall of constant thickness which is smooth and tapered outside and inside, and an enlarged accumulation chamber located above said freezing chamber, said freezing chamber being circular in transverse cross section and said accumulation chamber comprising a flat radially extending bottom portion integrally joined to said upper portion of said tapered freezing chamber, an upright cylindrical portion having a horizontally elongated rectangular opening, said cylindrical portion being integrally joined to said radially extending portion, and a top cover means for said accumulation chamber, said tapered freezing chamber provided with spaced upwardly flared serrations positioned around the upper portion of said inside wall, an insulated storage chamber having an opening positioned adjacent said freezing vessel, shut means joining said rectangular opening in said accumulation chamber to said opening in said insulated storage chamber, a support for said freezing vessel, bolt means securing said flanged base portion of said freezing vessel to said support, said support serving a bottom for said vessel and having an integrally formed upwardly extending cylindrical shaft housing means positioned concentrically of said tapered chamber, a frusto-conical auger means having an upper and lower portions positioned in said tapered chamber and forming an annulus with said inside wall of said freezing chamber of upwardly increasing cross section and having a helical flight adapted in its edge portion to slidably engage said inside wall of said tapered chamber, and a top blade flange means that extends completely around the top of the auger, said top blade flange means and said serrations forming a plurality of upwardly facing openings restricting said annulus between said auger and said inside wall, said flight having a top surface generated by rotating and simultaneously advancing a perpendicular vector radius about the axis of the auger, and a lower surface generated by rotating and advancing an upwardly inclined vector radius about said axis, said auger means provided with a relatively small concentric bore in said upper portion thereof and a large bore at the opposite lower end portion adapted to receive said shaft housing, a seal means positioned at said lower end portion of said auger engaging said large bore and said shaft housing, a supporting tapered roller bearing at said upper portion of said auger means engaging the shaft housing, an upright shaft extending through said shaft housing and in rigid relationship secured to said auger means, a vaned harvest means rigidly secured to said shaft and positioned in said accumulation chamber, a power means connected to said shaft to rotate same, refrigeration means including, cooling coils disposed about and operatively engaging the outside wall of said lower and said intermediate portions of said tapered freezing chamber, heat exchange coils disposed about and operatively engaging the outside wall of said upper portion of said freezing chamber, compressor means, heat exchanger means, expansion valve means, conduit means connecting said compressor means to said heat exchanger means, conduit means connecting said heat exchanger means to said heat exchanger coils, conduit means connecting said heat exchanger coil to said expansion valve means, conduit means connecting said expansion valve means to said cooling coils, and conduit means connecting said cooling coils to said compressor means, passage means disposed in said support for said freezing vessel to communicate with the interior of said freezing chamber, a float valve connected to a source of water, a conduit means connecting said float valve and passage means, said valve means, passage means and conduit means cooperating in operation to introduce and maintain fluid at a constant level in said freezing chamber, said apparatus to manufacture and store ice crystal particles constructed and adapted to freeze water introduced into the freezing chamber into relatively small crystal ice particles, expell said particles under pressure through said upwardly facing openings into said accumulation chamber, and transfer said particles with said harvest means into said insulated storage chamber.

2. An apparatus to manufacture frozen crystal particles comprising, a frusto-conical downwardly tapered freezing chamber having inside and outside surfaces and upper, intermediate and lower portions, said freezing chamber having spaced, upwardly flared serrations along the upper inside surface, an accumulation chamber having an opening integrally joined to said top portion of said freezing chamber, a frusto-conical auger mounted for rotation in said tapered freezing chamber, said auger provided with flight means and a top blade flange means that operatively contacts said inside surface of said freezing chamber, said top blade means and said serrations forming a plurality of upwardly facing constrictive openings, a rotary conveyor means provided with radially extending vanes rotatably mounted in said accumulation chamber, a vertical shaft rigidly joined to said conical auger and conveyor means extending out of said freezer vessel, a power means to rotate said shaft, a refrigeration means, said refrigeration means including cooling coils disposed about said outside of said bottom and said intermediate portions of said freezing chamber, heating coils disposed about said outside of said top portions of said freezing chamber, a pressure reducing valve positioned between and connecting said heating and cooling coils, a compressor, and a heat exchanger means, said refrigeration means constructed and adapted to expand and evaporate refrigerant in said cooling coils, and thereafter remove said refrigerant from said cooling coils and condense the evaporated refrigerant in said heat exchanger means and circulate the condensed refrigerant in said heating coils prior to its evaporation in said cooling coils, and a means to maintain a constant level of water in the freezing chamber including a float valve.

3. An apparatus to manufacture frozen crystal particles comprising, a frusto-conical downwardly tapered freezing chamber having inside and outside surfaces and upper, intermediate and lower portions, said freezing chamber having upwardly flared serrations along the upper inside surface, an accumulation chamber having an opening integrally joined to said upper portion of said freezing vessel, a frusto-conical auger mounted for rotation in said tapered freezing chamber, said auger provided with flight means and a top blade flange means that operatively contacts said inside surface of said freezing chamber, said top blade means and said serrations forming a plurality of upwardly facing constrictive openings of such area and size relative to the apparatus as to in operation impede the movement of frozen particles from the freezing chamber to such an extent that a high pressure is exerted upon said frozen particles to materially lower the melting point thereof, a vertical shaft rigidly joined to said frusto-conical auger extending out of said freezer vessel, a power means to rotate said shaft, a refrigeration means to remove heat from said freezing chamber, a means to introduce fluid to be frozen in said freezing chamber, said apparatus constructed and adapted to freeze fluid introduced into said freezing chamber into relatively small crystal particles, and expel said particles through said upwardly facing constrictive openings in said freezing chamber under a pressure sufficiently high to materially reduce the melting point and thereby cause the actual temperature of the particles to be lowered, whereupon emerging from said freezing chamber said particles being no longer under pressure are super cooled, which condition subsequently causes the particles to freeze the adherent fluid to produce dry frozen crystal particles.

4. An apparatus to manufacture frozen crystal particles comprising a freezing chamber having upper, intermediate and lower portions and inside and outside surfaces, an auger means rotatably mounted in said freezing chamber, a means to rotate said auger means, a refrigeration means, said refrigeration means including cooling coils disposed about said outside of said lower and said intermediate portions of said freezing chamber, means to introduce liquid to be frozen in said freezing chamber, and heating coils disposed about the outside of said upper portion of said freezing chamber, said refrigeration means constructed and adapted to remove heat from said intermediate and lower portions of said freezing chamber, and said heating coils adapted to add heat to said top portion of said freezing chamber.

5. The apparatus in claim 4 wherein there is provided a constricted outlet opening between the end of said auger and said inside surface of the freezing chamber which constricted outlet opening is in use adapted to momentarily materially increase the pressure exerted on the resultant frozen material as it is expelled to thereby lower the melting point of same.

6. The apparatus as set forth in claim 4 wherein there is provided a means to maintain a constant level of fluid in the freezing chamber including a float valve.

7. A freezer apparatus comprising, an upright freezing chamber having upper, intermediate and lower portions, auger means rotatably mounted in said freezing chamber, refrigeration means including expansion cooling coils to remove heat from said lower and intermediate portions of said freezing chamber, a means to introduce liquid to be frozen into said freezing chamber and a means to add heat to said upper portion of said freezing chamber, said means to add heat comprising a coil disposed about said upper portion being connected to said expansion cooling coils and supply refrigerant thereto, said apparatus constructed and adapted to freeze liquid disposed in said chamber in the lower and intermediate portions thereof, remove and force the frozen liquid material upwardly into said upper portion and out of said chamber.

8. A method of continuously producing dry crystal ice particles comprising the steps of (1) introducing water into a tapered frusto-conical freezing chamber, (2) removing heat from the lower and intermediate portions of said chamber thus freezing a layer of ice on the wall of same, (3) scraping the layer of ice from the chamber wall with a frusto-conical auger means disposed in said chamber, (4) moving the resulting ice particles upwardly from the portions of the chamber having a given cross sectional area to portions having a greater cross sectional area, (5) lowering the melting point of the resulting ice particles by applying a pressure to same by forcing same with said auger through a constricted outlet opening, (6) lowering the temperature of said ice particles by partially melting same and absorbing the resulting heat, (7) lowering the pressure on the resulting ice particles and raising the melting point thereof, (8) freezing the adherent water on the resulting ice particles by absorbing the resulting heat while simultaneously (9) adding a small quantity of heat to the area adjacent said opening to prevent freezing up of the auger and chamber.

9. A freezing apparatus comprising, a downwardly tapered freezing chamber having upper, intermediate and lower portions, and an outlet for frozen material in said upper portion, a frusto-conical shaped auger means rotatably mounted in said freezing chamber with the apex of same disposed in said lower portion thereof, means therewith constricting said outlet for frozen material in operation, said last-mentioned means to constrict said outlet for frozen material being of a size and area relative to said apparatus as to in operation impede the movement of frozen material from the freezing chamber to such an extent that a relatively high pressure is exerted on said frozen material to materially lower the melting point thereof, and a means disposed about said intermediate and bottom portions of said freezing chamber to remove heat from same, a means to introduce material to be frozen into said freezing chamber, and a heating means to add heat to the upper portion of said freezing chamber.

References Cited by the Examiner

UNITED STATES PATENTS

| | | | |
|---|---|---|---|
| 1,710,405 | 4/29 | Copeman | 62—275 |
| 2,282,862 | 5/42 | Genova | 62—342 X |
| 2,753,694 | 7/56 | Trow et al. | 62—354 X |
| 2,962,877 | 12/60 | Chaplik | 62—320 |
| 2,962,878 | 12/60 | Keller | 62—320 |
| 3,034,311 | 5/62 | Nelson | 62—320 |
| 3,126,719 | 3/64 | Swatsick | 62—320 |

FOREIGN PATENTS 409,499    5/34    Great Britain.

ROBERT A. O'LEARY *Primary Examiner.*

MEYER PERLIN, *Examiner.*